United States Patent
Kawakami et al.

(10) Patent No.: US 9,175,221 B2
(45) Date of Patent: Nov. 3, 2015

(54) NEMATIC LIQUID CRYSTAL COMPOSITION AND LIQUID CRYSTAL DISPLAY ELEMENT USING SAME

(71) Applicant: DIC CORPORATION, Tokyo (JP)

(72) Inventors: Shotaro Kawakami, Kita-adachi-gun (JP); Go Sudo, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/407,554

(22) PCT Filed: Jun. 10, 2013

(86) PCT No.: PCT/JP2013/065979
§ 371 (c)(1),
(2) Date: Dec. 12, 2014

(87) PCT Pub. No.: WO2013/187373
PCT Pub. Date: Dec. 19, 2013

(65) Prior Publication Data
US 2015/0152331 A1 Jun. 4, 2015

(30) Foreign Application Priority Data
Jun. 15, 2012 (JP) ................. 2012-135841

(51) Int. Cl.
| | |
|---|---|
| *C09K 19/54* | (2006.01) |
| *C09K 19/32* | (2006.01) |
| *G02F 1/13* | (2006.01) |
| *G02F 1/1368* | (2006.01) |
| *G02F 1/137* | (2006.01) |
| *C09K 19/04* | (2006.01) |
| *C09K 19/30* | (2006.01) |
| *C09K 19/12* | (2006.01) |
| *C09K 19/34* | (2006.01) |

(52) U.S. Cl.
CPC ............ *C09K 19/54* (2013.01); *C09K 19/0403* (2013.01); *C09K 19/3066* (2013.01); *C09K 19/322* (2013.01); *C09K 19/3402* (2013.01); *G02F 1/13* (2013.01); *G02F 1/137* (2013.01); *G02F 1/1368* (2013.01); *C09K 2019/0455* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3425* (2013.01); *G02F 2001/13712* (2013.01)

(58) Field of Classification Search
CPC .. C09K 19/20; C09K 19/322; C09K 19/3402; C09K 19/54; C09K 2019/0455; C09K 2019/0466; C09K 2019/122; C09K 2019/123; C09K 2019/3004; C09K 2019/3009; C09K 2019/3016; C09K 2019/301; C09K 2019/3425; G02F 1/1368
See application file for complete search history.

(56) References Cited

U.S. PATENT DOCUMENTS 5,430,565 A * 7/1995 Yamanouchi et al. ........ 349/120

FOREIGN PATENT DOCUMENTS

| JP | 54-122213 A | 9/1979 |
|---|---|---|
| JP | 11-189706 A | 7/1999 |
| JP | 2002-256267 A | 9/2002 |
| JP | 2007-254583 A | 10/2007 |
| JP | 2008-273957 A | 11/2008 |
| WO | 2009/034867 A1 | 3/2009 |
| WO | 2009/125668 A1 | 10/2009 |
| WO | 2009/150966 A1 | 12/2009 |

* cited by examiner

*Primary Examiner* — Shean C Wu
(74) *Attorney, Agent, or Firm* — Westerman, Hattori, Daniels & Adrian, LLP

(57) ABSTRACT

The present invention provides a nematic liquid crystal composition having a negative dielectric anisotropy with an absolute value from 2 to 8 at 25° C., the composition containing at least one liquid crystal compound having a negative dielectric anisotropy with an absolute value of 4 or more and at least one antioxidant, wherein the amount of the liquid crystal compound is not less than 3%; the present invention also provides a liquid crystal display device using such a liquid crystal composition. The present invention can give a liquid crystal composition having a negative $\Delta\varepsilon$, a liquid crystal phase in a wide temperature range, a small viscosity, a good solubility at low temperature, a high specific resistance and voltage holding ratio, and a stability to heat and light; hence, use of this liquid crystal composition enables a highly responsive liquid crystal display device, such as a VA type and a PSVA type, which has an excellent display quality with a reduction in defective display such as droplet stains and linear afterimages.

9 Claims, No Drawings

NEMATIC LIQUID CRYSTAL COMPOSITION AND LIQUID CRYSTAL DISPLAY ELEMENT USING SAME

TECHNICAL FIELD

The present invention relates to a nematic liquid crystal composition which is useful as a material for a liquid crystal display and which has a negative dielectric anisotropy ($\Delta\varepsilon$), and the present invention also relates to a liquid crystal display device using such a nematic liquid crystal composition.

BACKGROUND ART

Liquid crystal display devices have been applied to, for example, watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and VA (vertical alignment) and IPS (in-plane switching) types involving use of a TFT (thin film transistor). Liquid crystal compositions used in such liquid crystal display devices need to satisfy the following requirements: being stable to external elements such as moisture, air, heat, and light; having a liquid crystal phase in a wide temperature range mainly including room temperature as much as possible; having a low viscosity; and enabling a low driving voltage. In addition, liquid crystal compositions are composed of several to tens of compounds to adjust, for example, the dielectric anisotropy ($\Delta\varepsilon$) and/or refractive index anisotropy ($\Delta n$) to be optimum to individual display devices.

A liquid crystal composition having a negative $\Delta\varepsilon$ is used in vertical-alignment displays and widely applied to, for example, liquid crystal television sets. In all types of driving, there have been demands for low driving voltage, a quick response, and a broad range of operation temperature. In other words, a liquid crystal composition having a $\Delta\varepsilon$ with a large absolute value, a low viscosity ($\eta$), and a high nematic phase-isotropic liquid phase transition temperature (Tni) has been demanded. In order to determine $\Delta n \times d$ that is a product of $\Delta n$ and a cell gap (d), the $\Delta n$ of a liquid crystal composition needs to be adjusted to be in a proper range on the basis of the cell gap. In addition, a quick response is important in liquid crystal display devices applied to television sets or other apparatuses, which generates a need for a liquid crystal composition having a small rotational viscosity ($\gamma_1$). In particular, an enhancement in a response speed needs a thin cell gap, which has generated needs for both small viscosity and a high $\Delta n$ in recent years. For such a reason, a liquid crystal composition containing a compound having a fluorine-substituted terphenyl structure has been already developed as disclosed in Patent Literatures 1 and 2.

In order to practically use a liquid crystal composition in a liquid crystal display device, the liquid crystal composition needs not to generate problems with display quality. In particular, liquid crystal compositions used in active-matrix liquid crystal display devices driven by, for example, a TFT device need to have a high specific resistance and high voltage holding ratio. In addition, stability to external stimuli such as light and heat is also necessary. In view of such a circumstance, an antioxidant used for enhancing thermal stability and a liquid crystal composition containing such an antioxidant have been disclosed (see Patent Literatures 3 and 4); however, the effects thereof have been still insufficient. Specifically, since a liquid crystal compound having a large $\Delta n$ is relatively less stable to light and heat, the liquid crystal composition does not have a sufficiently stable quality.

Furthermore, as liquid crystal display devices have come to be used in a broad range of applications, usage and manufacturing thereof have been greatly changed; in order to adapt to such changes, properties other than known basic physical properties need to be optimum. In particular, a VA (vertical alignment) type and an IPS (in-plane switching) type have become popular as liquid crystal display devices in which liquid crystal compositions are used, and display devices having a very large size (e.g., 50 inches or lager) have been practically used. An increase in the size of substrates has changed a technique for putting a liquid crystal composition between substrates, and a one drop fill (ODF) technique has become mainstream in place of a typically employed vacuum injection technique (see Patent Literature 5); however, dropping a liquid crystal composition onto a substrate generates droplet stains with the result that display quality is degraded, which has become problematic. Moreover, in order to define the pretilt angle of the molecules of a liquid crystal material in a liquid crystal display device and enable quick response, PS (polymer stabilized) liquid crystal display devices and PSA (polymer sustained alignment) liquid crystal display devices have been developed (see Patent Literature 6), and the droplet stains have become more problematic. In particular, such display devices are characterized in that a monomer is added to a liquid crystal composition and that the monomer in the composition is cured; in many cases, the monomer is cured by exposing the composition to ultraviolet light. Hence, addition of a component that is less stable to light leads to a decrease in specific resistance or a voltage holding ratio and causes generation of droplet stains as well in some cases, which results in a disadvantage that is a reduction in the yield of liquid crystal display devices due to defective display.

In terms of these circumstances, a liquid crystal display device which satisfies the following requirements needs to be developed: maintaining properties and functions needed for liquid crystal display devices, such as high response speed; having high stability to, for instance, light and heat; and being less likely to suffer from defective display such as droplet stains and linear afterimages.

CITATION LIST

Patent Literature

PTL 1: Japanese Unexamined Patent Application Publication No. 2003-327965
PTL 2: WO 2007/077872
PTL 3: Japanese Unexamined Patent Application Publication No. 9-124529
PTL 4: Japanese Unexamined Patent Application Publication No. 2006-169472
PTL 5: Japanese Unexamined Patent Application Publication No. 6-235925
PTL 6: Japanese Unexamined Patent Application Publication No. 2002-357830

Technical Problem

It is an object of the present invention to provide a liquid crystal composition having a negative $\Delta\varepsilon$, a liquid crystal phase in a wide temperature range, a low viscosity or rotational viscosity, a good solubility at low temperature, a high specific resistance, a high voltage holding ratio, and stability to heat and light. It is another object of the present invention to provide a highly responsive liquid crystal display device, such as a VA type or a PSVA type, which uses such a liquid crystal composition and in which use of the liquid crystal composition gives excellent display quality with a reduction in defective display such as droplet stains and linear afterimages.

Solution to Problem

The inventor has studied a variety of liquid crystal compounds and chemical substances and found that a combination of specific compounds enables the above-mentioned objects to be achieved, thereby accomplishing the present invention.

An aspect of the present invention provides a nematic liquid crystal composition having a negative dielectric anisotropy with an absolute value from 2 to 8 at 25° C., the composition containing at least one liquid crystal compound having a negative dielectric anisotropy with an absolute value of 4 or more and at least one antioxidant represented by General Formula (II-1), wherein the amount of the liquid crystal compound is not less than 3%.

[Chem. 1]

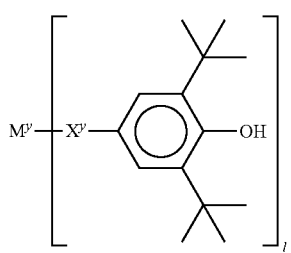

(II-1)

(in the formula, $M^y$ represents a hydrocarbon group having 1 to 25 carbon atoms (at least one —$CH_2$— of the hydrocarbon group is optionally substituted with —O—, —CO—, —COO—, or —OCO— such that oxygen atoms do not directly adjoin each other), a 1,4-phenylene group, or a trans-1,4-cyclohexylene group; any hydrogen atom of the 1,4-phenylene group is optionally substituted with a fluorine atom; $X^y$ represents an alkylene group having 1 to 15 carbon atoms (at least one —$CH_2$— of the alkylene group is optionally substituted with —O—, —CO—, —COO—, or —OCO— such that oxygen atoms do not directly adjoin each other), —$OCH_2$—, —$CH_2O$—, —COO—, —OCO—, —$CF_2O$—, —$OCF_2$—, —$CF_2CF_2$—, —CH=CH—COO—, —CH=CH—OCO—, —COO—CH=CH—, —OCO—CH=CH—, —CH=CH—, —C≡C—, a single bond, a 1,4-phenylene group, or a trans-1,4-cyclohexylene group; any hydrogen atom of the 1,4-phenylene group is optionally substituted with a fluorine atom; and l represents an integer from 2 to 6.)

Advantageous Effects of Invention

The liquid crystal composition of the present invention can have a very small viscosity or rotational viscosity, a good solubility at low temperature, and a high specific resistance and voltage holding ratio; in addition, the effect of heat and light on the liquid crystal composition is extremely small. Thus, the liquid crystal composition is highly practical. A liquid crystal display device, such as a VA type or a PSVA type, using such a liquid crystal composition can quickly respond; furthermore, defective display such as droplet stains and linear afterimages is reduced in the liquid crystal display device. Accordingly, the liquid crystal display device is very useful.

DESCRIPTION OF EMBODIMENTS

The liquid crystal composition of the present invention contains at least one liquid crystal compound having a negative dielectric anisotropy with an absolute value of 4 or more, and the amount of the liquid crystal compound is not less than 3 mass %, preferably not less than 5 mass %, more preferably not less than 10 mass %, and especially preferably not less than 20 mass %. More specifically, the amount of the liquid crystal compound is preferably in the range of 3 mass % to 70 mass %, more preferably 5 mass % to 60 mass %, further preferably 10 mass % to 60 mass %, and especially preferably 20 mass % to 60 mass %. The dielectric anisotropy of the liquid crystal compound is obtained at 25° C.

The liquid crystal composition of the present invention contains at least one antioxidant represented by General Formula (II-1).

[Chem. 2]

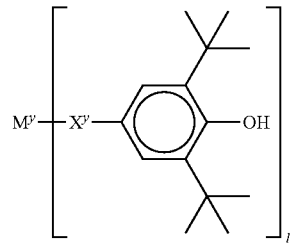

(II-1)

(In the formula, $M^y$ represents a hydrocarbon group having 1 to 25 carbon atoms (at least one —$CH_2$— of the hydrocarbon group is optionally substituted with —O—, —CO—, —COO—, or —OCO— such that oxygen atoms do not directly adjoin each other), a 1,4-phenylene group, or a trans-1,4-cyclohexylene group; any hydrogen atom of the 1,4-phenylene group is optionally substituted with a fluorine atom; $X^y$ represents an alkylene group having 1 to 15 carbon atoms (at least one —$CH_2$— of the alkylene group is optionally substituted with —O—, —CO—, —COO—, or —OCO— such that oxygen atoms do not directly adjoin each other), —$OCH_2$—, —$CH_2O$—, —COO—, —OCO—, —$CF_2O$—, —$OCF_2$—, —$CF_2CF_2$—, —CH=CH—COO—, —CH=CH—OCO—, —COO—CH=CH—, —OCO—CH=CH—, —CH=CH—, —C≡C—, a single bond, a 1,4-phenylene group, or a trans-1,4-cyclohexylene group; any hydrogen atom of the 1,4-phenylene group is optionally substituted with a fluorine atom; and l represents an integer from 2 to 6.)

$M^y$ is preferably a hydrocarbon group having 1 to 25 carbon atoms (at least one —$CH_2$— of the hydrocarbon group is optionally substituted with —O—, —CO—, —COO—, or —OCO— such that oxygen atoms do not directly adjoin each other). $X^y$ is preferably an alkylene group having 2 to 15 carbon atoms (at least one —$CH_2$— of the alkylene group is optionally substituted with —O—, —CO—, —COO—, or —OCO— such that oxygen atoms do not directly adjoin each other), a single bond, a 1,4-phenylene group, or a trans-1,4-cyclohexylene group. l is preferably from 2 to 4, and especially preferably 2.

The antioxidant represented by General Formula (II-1) is preferably any of compounds represented by General Formula (II-2)

[Chem 3.]

(II-2)

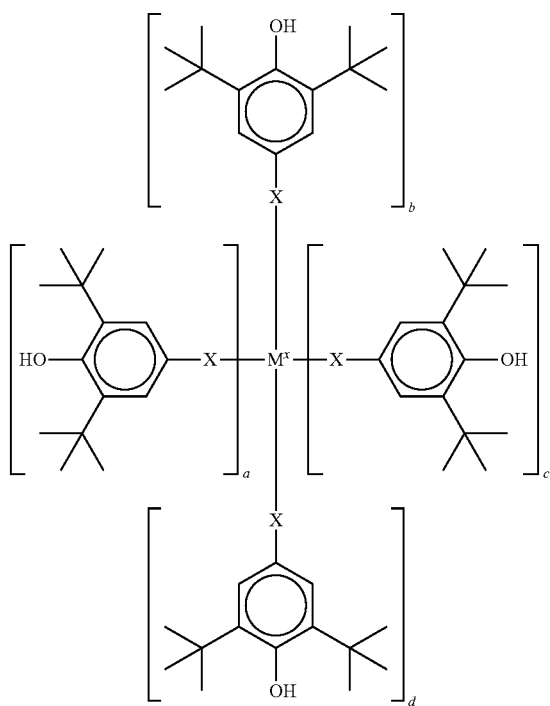

(In the formula, M$^x$ represents a hydrocarbon group having 1 to 25 carbon atoms (at least one —CH$_2$— of the hydrocarbon group is optionally substituted with —O—, —CO—, —COO—, or —OCO— such that oxygen atoms do not directly adjoin each other); X represents an alkylene group having 1 to 15 carbon atoms (at least one —CH$_2$— of the alkylene group is optionally substituted with —O—, —CO—, —COO—, or —OCO— such that oxygen atoms do not directly adjoin each other), —OCH$_2$—, —CH$_2$O—, —COO—, —OCO—, —CF$_2$O—, —OCF$_2$—, —CF$_2$CF$_2$—, —CH=CH—COO—, —CH=CH—OCO—, —COO—CH=CH—, —OCO—CH=CH—, —CH=CH—, —C≡C—, a single bond, a 1,4-phenylene group, or a trans-1,4-cyclohexylene group; any hydrogen atom of the 1,4-phenylene group is optionally substituted with a fluorine atom; and a, b, c, and d each independently represent 0 or 1, and a+b+c+d is 2 or more.)

M$^x$ is preferably a hydrocarbon group having 2 to 15 carbon atoms (at least one —CH$_2$— of the hydrocarbon group is optionally substituted with —O—, —CO—, —COO—, or —OCO— such that oxygen atoms do not directly adjoin each other); X is preferably an alkylene group having 2 to 15 carbon atoms (at least one —CH$_2$— of the alkylene group is optionally substituted with —O—, —CO—, —COO—, or —OCO— such that oxygen atoms do not directly adjoin each other), a single bond, a 1,4-phenylene group, or a trans-1,4-cyclohexylene group; and a+b+c+d is preferably from 2 to 4, and especially preferably 2.

In particular, the antioxidant is preferably a hindered phenol derivative represented by General Formula (II).

[Chem. 4]

(II)

(In the formula, M represents an alkylene group having 1 to 15 carbon atoms (at least one —CH$_2$— of the alkylene group is optionally substituted with —O—, —CO—, —COO—, or —OCO— such that oxygen atoms do not directly adjoin each other), —OCH$_2$—, —CH$_2$O—, —COO—, —OCO—, —CF$_2$O—, —OCF$_2$—, —CF$_2$CF$_2$—, —CH=CH—COO—, —CH=CH—OCO—, —COO—CH=CH—, —OCO—CH=CH—, —CH=CH—, —C≡C—, a single bond, a 1,4-phenylene group, or a trans-1,4-cyclohexylene group; and any hydrogen atom of the 1,4-phenylene group is optionally substituted with a fluorine atom.)

M in General Formula (II) is preferably an alkylene group having 1 to 15 carbon atoms; in view of volatility, it is preferred that the number of the carbon atoms be larger; and in view of viscosity, it is preferred that the number of the carbon atoms be not excessive. From this view point, M in General Formula (II) is more preferably an alkylene group having 2 to 15 carbon atoms, and especially preferably 2 to 10 carbon atoms.

Specifically, a compound represented by Formula (II-a) is preferred.

[Chem. 5]

(II-a)

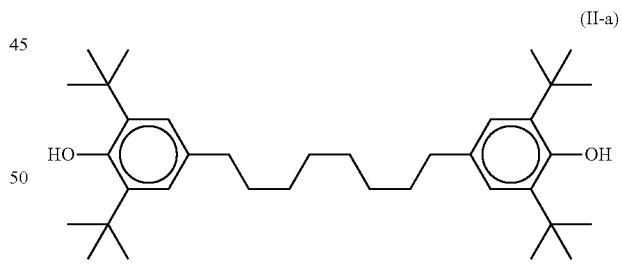

The liquid crystal composition of the present invention contains at least one antioxidant, and the amount thereof is preferably in the range of 0.001 to 1 mass %, more preferably 0.001 to 0.5 mass %, and especially preferably 0.01 to 0.3 mass %.

The liquid crystal compound contained in the liquid crystal composition of the present invention and having a negative dielectric anisotropy with an absolute value of 4 or more is preferably any of compounds represented by General Compound (1-a).

[Chem. 6]

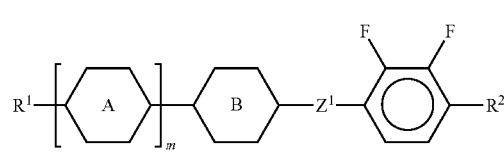
(I-a)

(In the formula, $R^1$ and $R^2$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; rings A and B each independently represent a trans-1,4-cyclohexylene group or a 1,4-phenylene group; any hydrogen atom of the 1,4-phenylene group is optionally substituted with a fluorine atom; $Z^1$ represents —OCH$_2$—, —CH$_2$O—, —CF$_2$O—, —OCF$_2$—, —CH$_2$CH$_2$—, —CF$_2$CF$_2$—, or a single bond; and m represents 0, 1, or 2.) In particular, any of compounds represented by General Formulae (I-a1) to (I-a10) is preferred.

[Chem. 7]

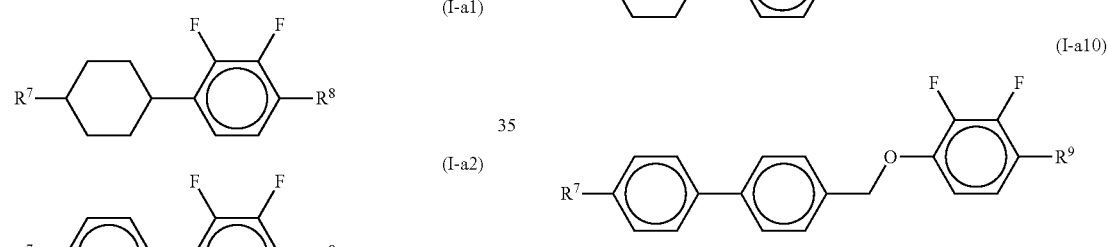

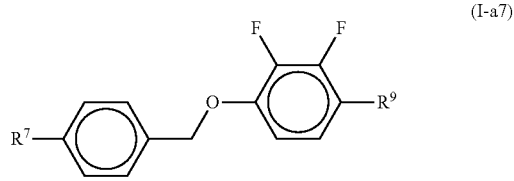

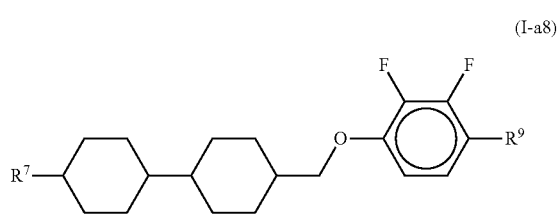

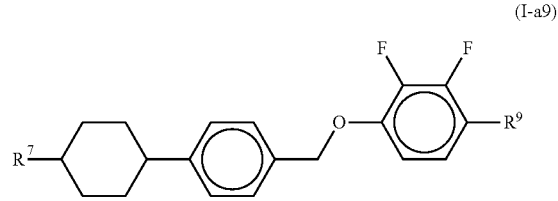

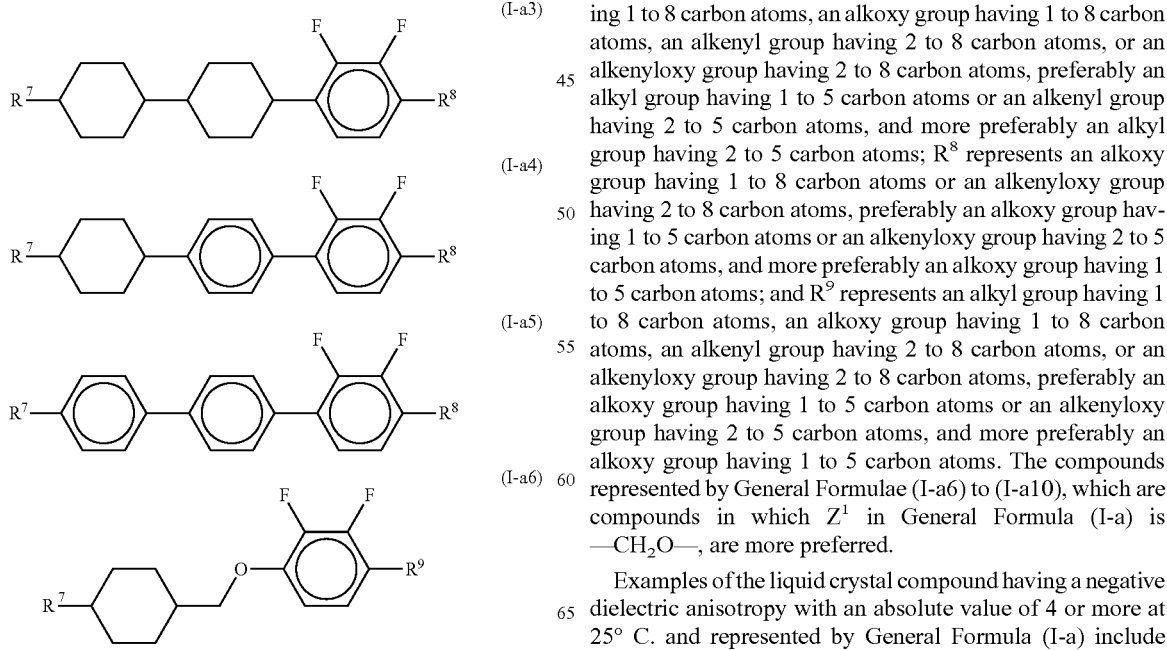

In each of the formulae, $R^7$ represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms or an alkenyl group having 2 to 5 carbon atoms, and more preferably an alkyl group having 2 to 5 carbon atoms; $R^8$ represents an alkoxy group having 1 to 8 carbon atoms or an alkenyloxy group having 2 to 8 carbon atoms, preferably an alkoxy group having 1 to 5 carbon atoms or an alkenyloxy group having 2 to 5 carbon atoms, and more preferably an alkoxy group having 1 to 5 carbon atoms; and $R^9$ represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkoxy group having 1 to 5 carbon atoms or an alkenyloxy group having 2 to 5 carbon atoms, and more preferably an alkoxy group having 1 to 5 carbon atoms. The compounds represented by General Formulae (I-a6) to (I-a10), which are compounds in which $Z^1$ in General Formula (I-a) is —CH$_2$O—, are more preferred.

Examples of the liquid crystal compound having a negative dielectric anisotropy with an absolute value of 4 or more at 25° C. and represented by General Formula (I-a) include compounds represented by the following formulae.

[Chem. 8]

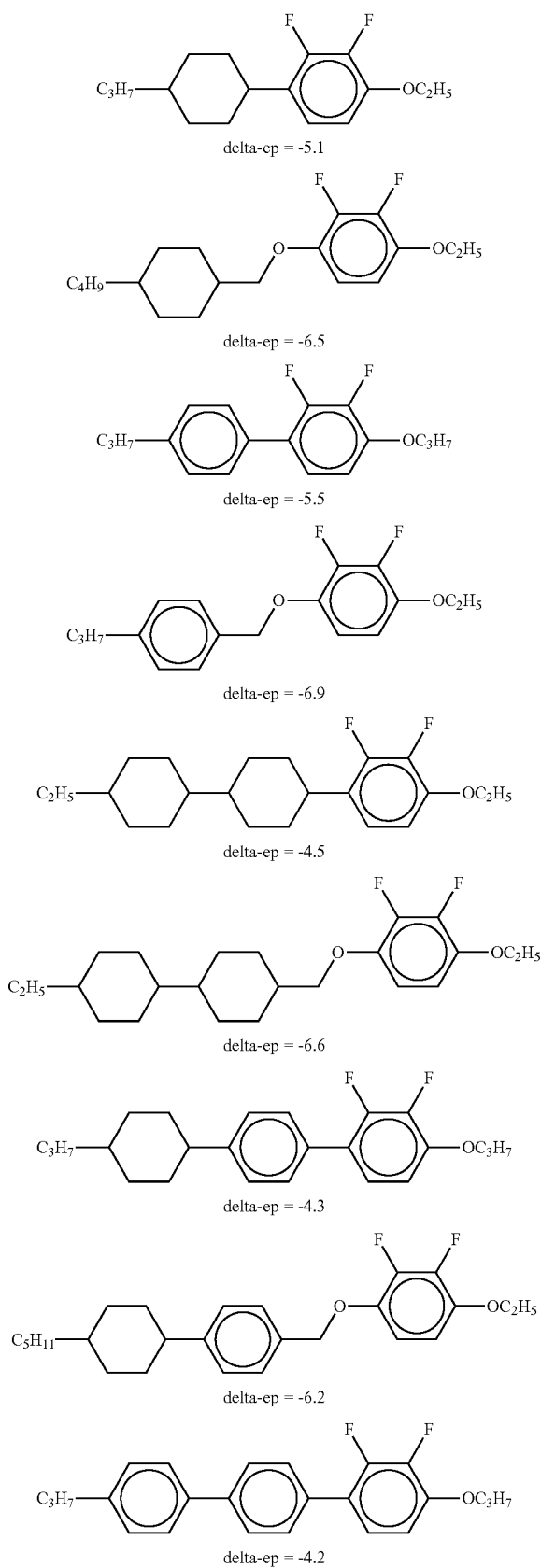

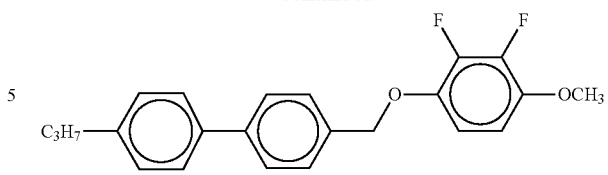

delta-ep represents a dielectric anisotropy ΔЄ of each liquid crystal compound at 25° C., and its value is obtained as follows: a composition is prepared by adding 10 mass % of corresponding one of each of the liquid crystal compounds to a liquid crystal composition having a dielectric anisotropy of approximately 0 at 25° C., and then the dielectric anisotropy ΔЄ of the added compound is extrapolated from the measured ΔЄ of the prepared composition.

The liquid crystal compound contained in the liquid crystal composition of the present invention and having a negative dielectric anisotropy with an absolute value of 4 or more is also preferably any of compounds represented by General Formula (I-b) or (I-bb).

[Chem. 9]

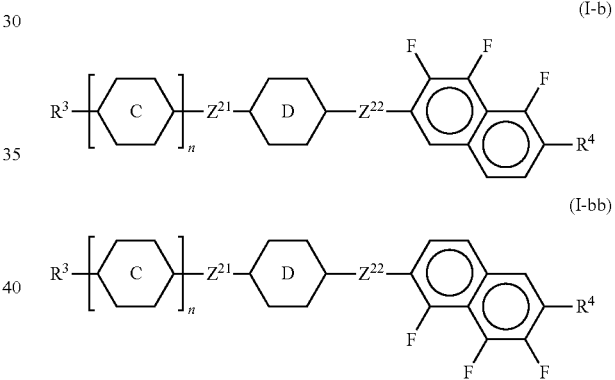

In the formulae, $R^3$ and $R^4$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; $R^3$ is preferably an alkyl group having 1 to 5 carbon atoms or an alkenyl group having 2 to 5 carbon atoms; $R^4$ is preferably an alkyl group having 1 to 5 carbon atoms or an alkoxy group having 1 to 5 carbon atoms; rings C and D each independently represent a trans-1,4-cyclohexylene group or a 1,4-phenylene group, any hydrogen atom of the 1,4-phenylene group is optionally substituted with a fluorine atom, and the trans-1,4-cyclohexylene group is preferred; $Z^{21}$ and $Z^{22}$ each independently represent —OCH$_2$—, —CH$_2$O—, —CF$_2$O—, —OCF$_2$—, —CH$_2$CH$_2$—, —CF$_2$CF$_2$—, —COO—, —OCO—, —CH=CH—, or a single bond; and n represents 0, 1, or 2, and preferably 0 or 1.

Examples of the liquid crystal compound having a negative dielectric anisotropy with an absolute value of 4 or more at 25° C. and represented by General Formula (I-b) or (I-bb) include compounds represented by the following formulae.

[Chem. 10]

-continued

-continued

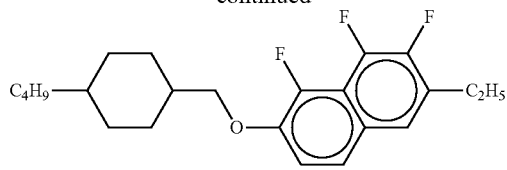

delta-ep = −6.8

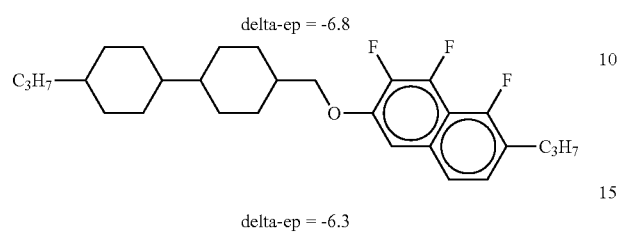

delta-ep = −6.3 delta-ep represents a dielectric anisotropy Δ∈ of each liquid crystal compound at 25° C., and its value is obtained as follows: a composition is prepared by adding 10 mass % of corresponding one of each of the liquid crystal compounds to a liquid crystal composition having a dielectric anisotropy of approximately 0 at 25° C., and then the dielectric anisotropy Δ∈ of the added compound is extrapolated from the measured Δ∈ of the prepared composition.

The liquid crystal compound contained in the liquid crystal composition of the present invention and having a negative dielectric anisotropy with an absolute value of 4 or more is also preferably any of compounds represented by General Formula (I-c) or (I-cc).

[Chem. 11]

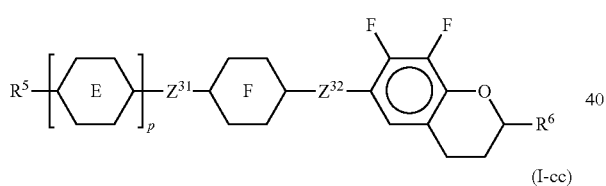
(I-c)

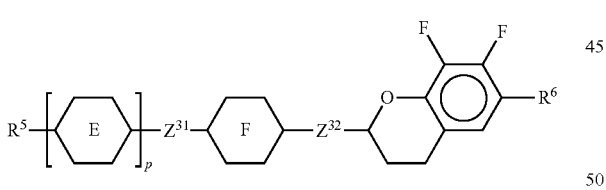
(I-cc)

In the formulae, $R^5$ and $R^6$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; $R^5$ is preferably an alkyl group having 1 to 5 carbon atoms or an alkenyl group having 2 to 5 carbon atoms; $R^6$ is preferably an alkyl group having 1 to 5 carbon atoms or an alkoxy group having 1 to 5 carbon atoms; rings E and F each independently represent a trans-1,4-cyclohexylene group or a 1,4-phenylene group, any hydrogen atom of the 1,4-phenylene group is optionally substituted with a fluorine atom, and the trans-1,4-cyclohexylene group is preferred; $Z^{31}$ and $Z^{32}$ each independently represent —OCH$_2$—, —CH$_2$O—, —CF$_2$O—, —OCF$_2$—, —CH$_2$CH$_2$—, —CF$_2$CF$_2$—, —COO—, —OCO—, —CH=CH—, or a single bond; and p represents 0, 1, or 2, and preferably 0 or 1.

Examples of the liquid crystal compound having a negative dielectric anisotropy with an absolute value of 4 or more at 25° C. and represented by General Formula (I-c) or (I-cc) include compounds represented by the following formulae.

[Chem. 12]

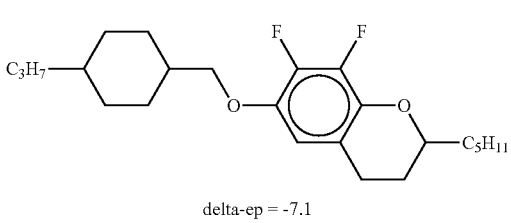

delta-ep = −7.1

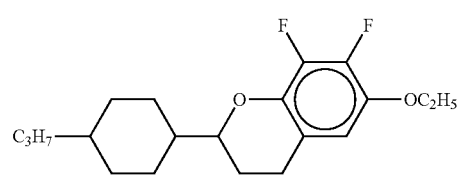

delta-ep = −7.8

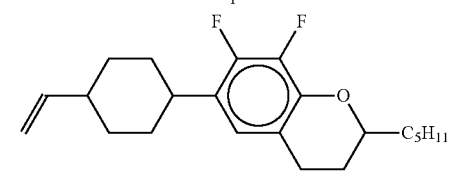

delta-ep = −5.4

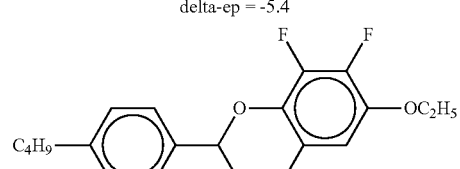

delta-ep = −6.4

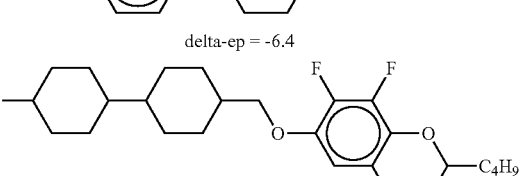

delta-ep = −6.9

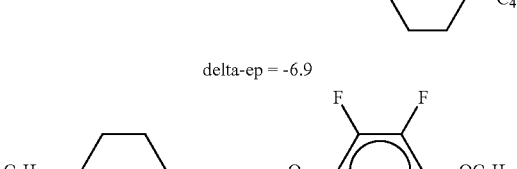

delta-ep = −7.6

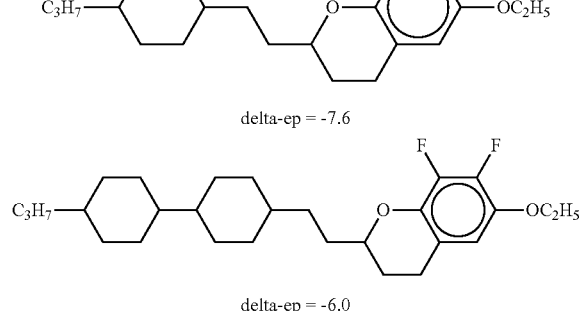

delta-ep = −6.0

-continued

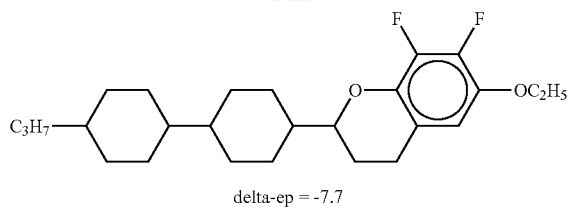

delta-ep = −7.7

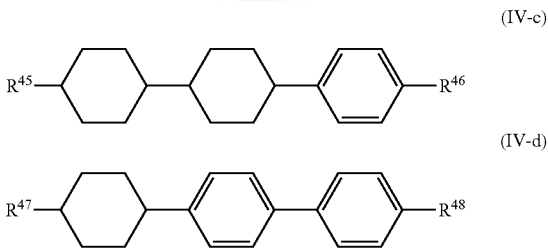

In the formulae, $R^{41}$ to $R^{48}$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms.

delta-ep represents a dielectric anisotropy $\Delta \in$ of each liquid crystal compound at 25° C., and its value is obtained as follows: a composition is prepared by adding 10 mass % of corresponding one of each of the liquid crystal compounds to a liquid crystal composition having a dielectric anisotropy of approximately 0 at 25° C., and then the dielectric anisotropy $\Delta \in$ of the added compound is extrapolated from the measured $\Delta \in$ of the prepared composition.

The liquid crystal composition of the present invention contains at least one liquid crystal compound having a negative dielectric anisotropy with an absolute value of 4 or more; a liquid crystal compound having a negative dielectric anisotropy with an absolute value of 4.5 or more is preferably used, and a liquid crystal compound having a negative dielectric anisotropy with an absolute value of 5 or more is especially preferably used.

It is also preferred that the liquid crystal composition of the present invention further contain any of compounds represented by General Formula (III).

[Chem. 13]

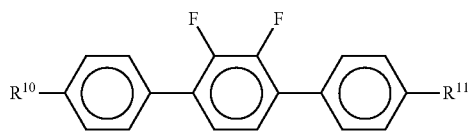

In the formula, $R^{10}$ and $R^{11}$ each represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms.

The liquid crystal composition of the present invention preferably contains one to five compounds represented by General Formula (III), and the amount thereof is preferably in the range of 3 to 30 mass %, and preferably 5 to 25 mass %.

The liquid crystal composition of the present invention can further contain any of compounds represented by General Formulae (IV-a) to (IV-d).

[Chem. 14]

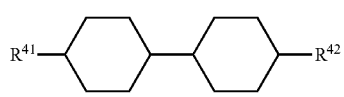

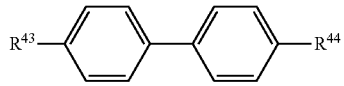

The liquid crystal composition of the present invention preferably contains one to ten compounds selected from the compounds represented by General Formulae (IV-a) to (IV-d), and more preferably one to eight compounds; the amount thereof is preferably in the range of 5 to 80 mass %, more preferably 10 to 70 mass %, and especially preferably 20 to 60 mass %.

The dielectric anisotropy $\Delta \in$ of the liquid crystal composition of the present invention at 25° C. is in the range of −2.0 to −8.0, preferably −2.0 to −6.0, more preferably −2.0 to −5.0, and especially preferably −2.5 to −4.0.

The refractive index anisotropy $\Delta n$ of the liquid crystal composition of the present invention at 20° C. is in the range of 0.08 to 0.14, preferably 0.09 to 0.13, and especially preferably 0.09 to 0.12. In particular, the refractive index anisotropy $\Delta n$ is preferably in the range of 0.10 to 0.13 for a thin cell gap and 0.08 to 0.10 for a thick cell gap.

The viscosity $\eta$ of the liquid crystal composition of the present invention at 20° C. is in the range of 10 to 30 mPa·s, preferably 10 to 25 mPa·s, and especially preferably 10 to 22 mPa·s.

The rotational viscosity $\gamma 1$ of the liquid crystal composition of the present invention at 20° C. is in the range of 60 to 130 mPa·s, preferably 60 to 110 mPa·s, and especially preferably 60 to 100 mPa·s.

The liquid crystal composition of the present invention has a $T_{ni}$ that is in the range of 60° C. to 120° C., preferably 70° C. to 100° C., and especially preferably 70° C. to 85° C.

The liquid crystal composition of the present invention may contain general nematic liquid crystal, smectic liquid crystal, cholesteric liquid crystal, and polymerizable monomer in addition to the above-mentioned compounds.

The liquid crystal composition of the present invention may contain a polymerizable compound to produce a liquid crystal display device of, for example, a PS mode, PSA mode, or PSVA mode. Examples of a usable polymerizable compound include photopolymerizable monomers which are polymerized by being irradiated with energy rays such as light; in particular, examples of such polymerizable compounds include polymerizable compounds having a liquid crystal molecular framework in which six-membered rings are bonded to each other, such as biphenyl derivatives and terphenyl derivatives. Specifically, the polymerizable compound is preferably a difunctional monomer represented by General Formula (V).

[Chem. 15]

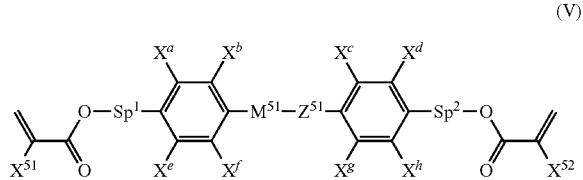
(V)

In the formula, $X^{51}$ and $X^{52}$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer from 2 to 7, and the oxygen atom is bonded to an aromatic ring); $Z^{51}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; $M^{51}$ represents a 1,4-phenylene group, a trans-1,4-cyclohexylene group, or a single bond, and any hydrogen atom of the 1,4-phenylene group is optionally substituted with a fluorine atom; and $X^a$ to $X^h$ each independently represent a hydrogen atom, a fluorine atom, or a methyl group.

Both diacrylate derivatives in which $X^{51}$ and $X^{52}$ each represent a hydrogen atom and dimethacrylate derivatives in which $X^{51}$ and $X^{52}$ are each a methyl group are preferred, and compounds in which one of $X^{51}$ and $X^{52}$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^1$ and $Sp^2$ each independently represent a single bond, an alkylene group having 1 to 8 carbon atoms, or —O—$(CH_2)_s$—; in an application to PSA display devices, at least one of $Sp^1$ and $Sp^2$ is preferably a single bond, and compounds in which $Sp^1$ and $Sp^2$ each represent a single bond and compounds in which one of $Sp^1$ and $Sp^2$ is a single bond and in which the other one thereof represents an alkylene group having 1 to 8 carbon atoms or —O—$(CH_2)_s$— are preferred. In this case, an alkyl group having 1 to 4 carbon atoms is preferably employed, and s is preferably from 1 to 4.

$Z^{51}$ is preferably —$OCH_2$—, —$CH_2O$—, —COO—, —OCO—, —$CF_2O$—, —$OCF_2$—, —$CH_2CH_2$—, —$CF_2CF_2$—, or a single bond; more preferably —COO—, —OCO—, or a single bond; and especially preferably a single bond.

$M^{51}$ represents a 1,4-phenylene group in which any hydrogen atom is optionally substituted with a fluorine atom, a trans-1,4-cyclohexylene group, or a single bond; and a 1,4-phenylene group and a single bond are preferred. In the case where $M^{51}$ does not represent a single bond but represents a ring structure, $Z^{51}$ preferably represents a linking group as well as a single bond; in the case where $M^{51}$ represents a single bond, $Z^{51}$ is preferably a single bond.

From these viewpoints, a preferred ring structure between $Sp^1$ and $Sp^2$ in General Formula (V) is particularly as follows.

In General Formula (V), in the case where $M^{51}$ represents a single bond and where the ring structure consists of two rings, the ring structure is preferably represented by any of Formulae (Va-1) to (Va-5), and more preferably Formulae (Va-1) to (Va-3).

[Chem. 16]

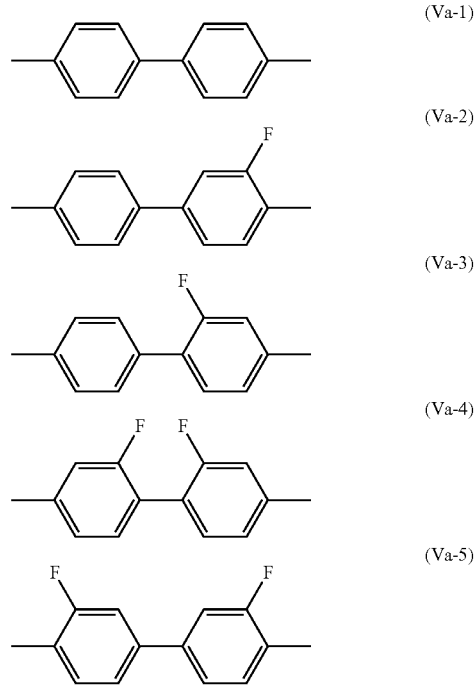

(In each of the formulae, the two ends of the structure are bonded to $Sp^1$ and $Sp^2$, respectively.)

Polymerizable compounds having such skeletons enable uneven display to be reduced or eliminated in PSA liquid crystal display devices because such polymerizable compounds have optimum alignment regulating force after being polymerized and thus produce a good alignment state.

In the case where the monomer is added to the liquid crystal composition of the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides.

The liquid crystal composition of the present invention, to which a polymerizable compound has been added, is irradiated with ultraviolet to polymerize the polymerizable compound with the result that liquid crystal molecules can be aligned; thus, such a liquid crystal composition is used in liquid crystal display devices in which the refractive index anisotropy of the liquid crystal composition is utilized to control the amount of light that is to be transmitted. Such a liquid crystal composition is useful for liquid crystal display devices, such as an AM-LCD (active-matrix liquid crystal display device), a TN (nematic liquid crystal display device), an STN-LCD (super twisted nematic liquid crystal display device), an OCB-LCD, and an IPS-LCD (in-plane switching liquid crystal display device), particularly useful for an AM-LCD, and can be used in transmissive or reflective liquid crystal display devices.

A liquid crystal display device of the present invention includes a first substrate formed of a transparent conductive material and having a common electrode, a second substrate formed of a transparent conductive material and having pixel electrodes and thin film transistors which are provided in individual pixels to control the pixel electrodes, and a liquid crystal composition disposed between the first substrate and the second substrate. In the liquid crystal display device, the liquid crystal molecules of the liquid crystal composition are aligned substantially vertical to the substrates in a state in which voltage is not applied. The liquid crystal display device will now be more specifically described.

Two substrates used in a liquid crystal cell included in the liquid crystal display device can be made of a transparent material having flexibility, such as glass or a plastic material, and one of these substrates may be made of a non-transparent material such as silicon. The transparent substrate having a transparent electrode layer can be formed by, for example, sputtering indium tin oxide (ITO) on a transparent plate such as a glass plate.

Color filters can be produced by, for instance, a pigment dispersion technique, a printing technique, an electrodeposition technique, or a staining technique. In production of the color filters by, for example, a pigment dispersion technique, a curable colored composition for a color filter is applied onto the transparent substrate, subjected to patterning, and then cured by being heated or irradiated with light. This process is carried out for each of three colors of red, green, and blue, thereby being able to produce the pixels of the color filters. Active elements such as a TFT, a thin-film diode, a metal insulator, and a metal specific resistance element may be provided on the resulting substrate to form the pixel electrodes.

The substrates are arranged so as to face each other with the transparent electrode layer interposed therebetween. In the arrangement of the substrates, a spacer may be present between the substrates to adjust the distance therebetween. In this case, the distance between the substrates is adjusted so that the thickness of a light modulating layer to be formed is preferably in the range of 1 to 100 μm, and more preferably 1.5 to 10 μm. In the case where a polarizing plate is used, the product of the refractive index anisotropy Δn of liquid crystal and a cell thickness d is preferably adjusted to achieve the maximum contrast. In the case where two polarizing plates are used, the polarization axis of each polarizing plate can be adjusted to give a good viewing angle or contrast. Furthermore, a retardation film may be also used to increase a viewing angle. The spacer can be, for instance, glass particles, plastic particles, alumina particles, or photoresist materials. A sealing material such as a thermosetting epoxy composition is subsequently applied to the substrates by screen printing in a state in which a liquid crystal inlet has been formed, the substrates are attached to each other, and then the sealing material is heated to be thermally cured.

The polymerizable-compound-containing liquid crystal composition can be put into the space between the two substrates by, for instance, a vacuum injection technique or ODF technique which is generally employed. A vacuum injection technique, however, has a problem in which traces of the injection remain while droplet stains do not remain. The present invention can be more suitably applied to display devices manufactured by an ODF technique.

The liquid crystal display device of the present invention may be a liquid crystal display device produced through polymerization of a polymerizable compound contained in the liquid crystal composition in a state in which voltage is applied or not applied. Such a liquid crystal display device will be more specifically described below.

Since a proper polymerization rate is desired to enable liquid crystal molecules to be aligned in a good manner, the polymerizable compound is preferably polymerized by being irradiated with one of active energy rays, such as an ultraviolet ray and an electron beam, or by being irradiated with such active energy rays used in combination or in sequence. In the use of an ultraviolet ray, a polarized light source or a non-polarized light source may be used. In the case where the polymerizable-compound-containing liquid crystal composition is polymerized in a state in which the composition has been disposed between the two substrates, at least the substrate on the side from which active energy rays are emitted needs to have transparency suitable for the active energy rays. Another technique may be used, in which only the intended part is polymerized by being irradiated with light with a mask, the alignment state of the non-polymerized part is subsequently changed by adjusting conditions such as an electric field, a magnetic field, or temperature, and then polymerization is further carried out through irradiation with active energy rays. In particular, it is preferred that exposure to ultraviolet radiation be carried out while an alternating current electric field is applied to the polymerizable-compound-containing liquid crystal composition. The alternating current electric field to be applied preferably has a frequency ranging from 10 Hz to 10 kHz, and more preferably 60 Hz to 10 kHz; and the voltage is determined on the basis of a predetermined pretilt angle in a liquid crystal display device. In other words, the pretilt angle in a liquid crystal display device can be controlled by adjusting voltage that is to be applied. In MVA-mode liquid crystal display devices, a pretilt angle is preferably controlled to be from 80 degrees to 89.9 degrees in view of alignment stability and contrast.

The temperature in the irradiation procedure is preferably in a temperature range in which the liquid crystal state of the liquid crystal composition of the present invention can be maintained. Polymerization is preferably carried out at a temperature close to room temperature, i.e., typically from 15 to 35° C. Examples of a lamp usable for emitting an ultraviolet ray include a metal halide lamp, a high-pressure mercury lamp, and an ultrahigh-pressure mercury lamp. In addition, an ultraviolet ray to be emitted preferably has a wavelength that is in a wavelength region different from the wavelength region of light absorbed by the liquid crystal composition; it is preferred that an ultraviolet ray in a particular wavelength range be cut off as needed. The intensity of an ultraviolet ray to be emitted is preferably from 0.1 mW/cm$^2$ to 100 W/cm$^2$, and more preferably 2 mW/cm$^2$ to 50 W/cm$^2$. The energy of an ultraviolet ray to be emitted can be appropriately adjusted: preferably from 10 mJ/cm$^2$ to 500 J/cm$^2$, and more preferably 100 mJ/cm$^2$ to 200 J/cm$^2$. The intensity may be changed in the exposure to ultraviolet radiation. The time of the exposure to ultraviolet radiation is appropriately determined on the basis of the intensity of an ultraviolet ray to be emitted: preferably from 10 seconds to 3600 seconds, and more preferably 10 seconds to 600 seconds.

Liquid crystal display devices using the liquid crystal composition of the present invention are practical because they quickly respond and are less likely to suffer from defective display, such as droplet stains and linear afterimages, at the same time; in particular, the liquid crystal composition is useful to active-matrix liquid crystal display devices and can be applied to liquid crystal display devices of a VA mode, PSVA mode, PSA mode, IPS mode, and ECB mode.

EXAMPLES

Although the present invention will now be described further in detail with reference to Examples, the present invention is not limited to Examples. In compositions which will be described in Examples and Comparative Examples, the term "%" refers to "mass %".

In Examples, the following properties were measured.

$T_{ni}$: Nematic phase-isotropic liquid phase transition temperature (° C.)

Δn: Refractive index anisotropy at 20° C.

Δ∈: Dielectric anisotropy at 25° C.

η: Viscosity at 20° C. (mPa·s)

γ1: Rotational viscosity at 20° C. (mPa·s)

RT: Response speed at 20° C. (msec) (VA cell having a cell thickness of 3.5 μm)

VHR (Init): Voltage holding ratio (%) measured at 60° C. under conditions including a frequency of 60 Hz and an applied voltage of 1 V VHR (HEAT): Voltage holding ratio (%) measured at 60° C. under conditions including a frequency of 60 Hz and an applied voltage of 1 V after a sample was left to stand at 100° C. for 48 hours Droplet Stains: In order to evaluate droplet stains in a liquid crystal display apparatus, white droplet stains which emerged in an entirely-black display mode were visually observed. Result of the observation was evaluated on the basis of the following four criteria.

Excellent: No droplet stain observed
Good: Slight droplet stains observed, but acceptable
Bad: Droplet stains observed, unacceptable
Poor: Droplet stains observed, quite inadequate Linear Afterimages: In a test of linear afterimages generated in a liquid crystal display device, a certain fixed pattern was displayed in a display area for 2000 hours, and then the degree of linear afterimages generated at the edges of the fixed pattern was visually observed. Result of the observation was evaluated on the basis of the following four criteria.

Excellent: No linear afterimage observed
Good: Slight linear afterimages observed, but acceptable
Bad: Linear afterimages observed, unacceptable
Poor: Linear afterimages observed, quite inadequate In Examples, the following abbreviations are used to describe compounds.

(Side Chain)

-n —$C_nH_{2n+1}$ Linear alkyl group having n carbon atoms
n- $C_nH_{2n+1}$— Linear alkyl group having n carbon atoms
—On —$OC_nH_{2n+1}$ Linear alkoxy group having n carbon atoms
nO— $C_nH_{2n+1}O$— Linear alkoxy group having n carbon atoms
—V —$CH=CH_2$
V— $CH_2=CH$—
—V1 —$CH=CH-CH_3$
1V— $CH_3-CH=CH$—

(Ring Structure)

[Chem. 17]

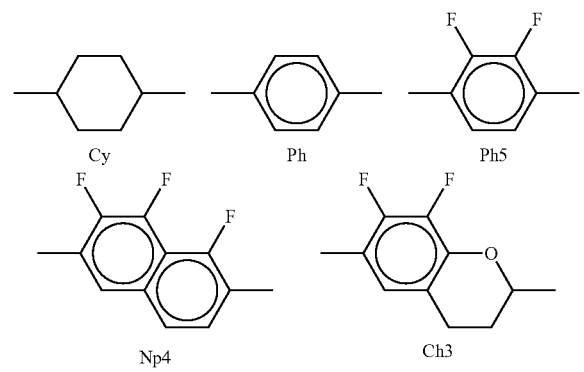

Example 1 and Comparative Examples 1 to 3

A liquid crystal composition LC-A (Comparative Example 1) was prepared, and then 0.05% of an antioxidant (II-a) was added to 99.95% of the LC-A to prepare a liquid crystal composition LC-1 (Example 1). To 99.95% of the LC-A, 0.05% of antioxidants (St-1) and (St-2) were added to prepare liquid crystal compositions LC-A1 (Comparative Example 2) and LC-A2 (Comparative Example 3), respectively. The physical properties, VHR (Init), and VHR (HEAT) of these compositions were measured; and the compositions were subjected to the evaluations of droplet stains and linear afterimages. Results of the measurement and evaluations were as follows.

TABLE 1

|  |  | Example 1 LC-1 | Comparative Example 1 LC-A | Comparative Example 2 LC-A1 | Comparative Example 3 LC-A2 |
| --- | --- | --- | --- | --- | --- |
| 3-Ph—Ph-1 | General Formula (IV-b) | — | 5 | — | — |
| 3-Cy-Cy-V | General Formula (IV-a) | — | 39 | — | — |
| 3-Cy-1O—Ph5—O2 | General Formula (I-a) | — | 9 | — | — |
| 2-Cy-Cy-1O—Ph5—O2 | General Formula (I-a) | — | 13 | — | — |
| 3-Cy-Cy-1O—Ph5—O2 | General Formula (I-a) | — | 13 | — | — |
| 4-Cy-Cy-1O—Ph5—O2 | General Formula (I-a) | — | 3 | — | — |
| 3-Ph—Ph5—Ph-1 | General Formula (III) | — | 9 | — | — |
| 3-Ph—Ph5—Ph-2 | General Formula (III) | — | 9 | — | — |
| Comparative Example 1 |  | 99.95 | — | 99.95 | 99.95 |
| Antioxidant (II-a) |  | 0.05 | — | — | — |
| Antioxidant (St-1) |  | — | — | 0.05 | — |
| Antioxidant (St-2) |  | — | — | — | 0.05 |
| Total |  | 100 | 100 | 100 | 100 |
| Tni[° C.] |  | 74.6 | 75.0 | 74.3 | 74.5 |
| Δn |  | 0.107 | 0.107 | 0.107 | 0.107 |
| η[mPa · s] |  | 13.8 | 13.8 | 13.9 | 13.9 |
| γ¹[mPa · s] |  | 94 | 95 | 95 | 95 |
| RT[msec] |  | 3.8 | 3.8 | 3.8 | 3.8 |
| Δε |  | −3.13 | −3.14 | −3.14 | −3.14 |

TABLE 1-continued

|  | Example 1 LC-1 | Comparative Example 1 LC-A | Comparative Example 2 LC-A1 | Comparative Example 3 LC-A2 |
|---|---|---|---|---|
| VHR(Init) | 99.8 | 99.7 | 99.7 | 99.7 |
| VHR(HEAT) | 99.5 | 98.5 | 98.9 | 99.0 |
| Droplet stains | Excellent | Excellent | Good | Bad |
| Linear afterimages | Excellent | Bad | Bad | Bad |

The antioxidants (St-1) and (St-2) were compounds represented by the following formulae.

[Chem. 18]

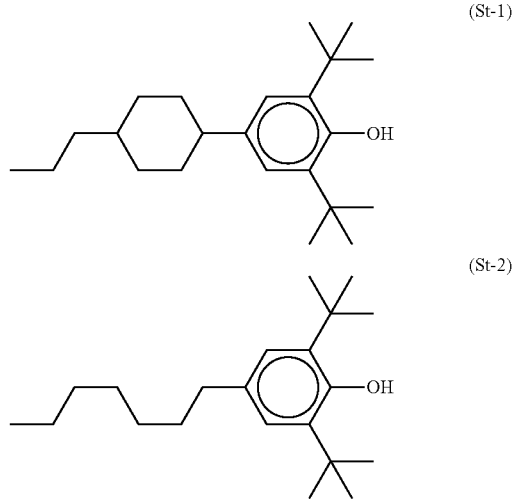

The results showed significant differences in VHR (HEAT) and the evaluations of droplet stains and linear afterimages. As is clear from the results, the liquid crystal composition LC-1 of the present invention was a liquid crystal composition having a negative $\Delta\epsilon$, a liquid crystal phase in a wide temperature range, a small viscosity, a good solubility at low temperature, a high specific resistance and voltage holding ratio, and a stability to heat and light; in addition, a liquid crystal display device using such a liquid crystal composition had an excellent display quality and was less likely to suffer from defective display such as droplet stains and linear afterimages.

Example 2 and Comparative Examples 4 to 6

A liquid crystal composition LC-B (Comparative Example 4) was prepared, and then 0.02% of an antioxidant (II-a) was added to 99.98% of the LC-B to prepare a liquid crystal composition LC-2 (Example 2). To 99.98% of the LC-B, 0.02% of antioxidants (St-1) and (St-2) were added to prepare liquid crystal compositions LC-B1 (Comparative Example 5) and LC-B2 (Comparative Example 6), respectively. The physical properties, VHR (Init), and VHR (HEAT) of these compositions were measured; and the compositions were subjected to the evaluations of droplet stains and linear afterimages. Results of the measurement and evaluations were as follows.

TABLE 2

|  |  | Example 2 LC-2 | Comparative Example 4 LC-B | Comparative Example 5 LC-B1 | Comparative Example 6 LC-B2 |
|---|---|---|---|---|---|
| 3-Cy-Cy-V | General Formula (IV-a) | — | 43 | — | — |
| 3-Cy—Ph5—O1 | General Formula (I-a) | — | 3 | — | — |
| 3-Cy-1O—Ph5—O2 | General Formula (I-a) | — | 8 | — | — |
| 2-Cy-Cy-1O—Ph5—O2 | General Formula (I-a) | — | 11 | — | — |
| 3-Cy-Cy-1O—Ph5—O2 | General Formula (I-a) | — | 12 | — | — |
| 3-Ph—Ph5—Ph-1 | General Formula (III) | — | 8 | — | — |
| 3-Ph—Ph5—Ph-2 | General Formula (III) | — | 15 | — | — |
| Comparative Example 4 |  | 99.98 | — | 99.98 | 99.98 |
| Antioxidant (II-a) |  | 0.02 | — | — | — |
| Antioxidant (St-1) |  | — | — | 0.02 | — |
| Antioxidant (St-2) |  | — | — | — | 0.02 |
| Total |  | 100 | 100 | 100 | 100 |
| Tni[° C.] |  | 73.8 | 73.9 | 73.6 | 73.7 |
| $\Delta n$ |  | 0.107 | 0.107 | 0.107 | 0.107 |
| $\eta$[mPa·s] |  | 13.9 | 13.9 | 14.0 | 13.9 |
| $\gamma^1$[mPa·s] |  | 86 | 86 | 87 | 86 |
| RT[msec] |  | 3.4 | 3.4 | 3.4 | 3.4 |
| $\Delta\epsilon$ |  | −2.89 | −2.89 | −2.89 | −2.89 |
| VHR(Init) |  | 99.9 | 99.9 | 99.9 | 99.9 |
| VHR(HEAT) |  | 99.8 | 98.9 | 99.1 | 99.2 |
| Droplet stains |  | Excellent | Excellent | Bad | Bad |
| Linear afterimages |  | Excellent | Bad | Bad | Bad |

The results showed that the liquid crystal composition LC-2 was a liquid crystal composition having a negative $\Delta\epsilon$, a liquid crystal phase in a wide temperature range, a small viscosity, a good solubility at low temperature, a high specific resistance and voltage holding ratio, and a stability to heat and light; in addition, a liquid crystal display device using such a liquid crystal composition had an excellent display quality and was less likely to suffer from defective display such as droplet stains and linear afterimages.

Example 3 and Comparative Examples 7 to 9

A liquid crystal composition LC-C(Comparative Example 7) was prepared, and then 0.1% of an antioxidant (II-a) was added to 99.9% of the LC-C to prepare a liquid crystal composition LC-3 (Example 3). To 99.9% of the LC-C, 0.1% of antioxidants (St-1) and (St-2) were added to prepare liquid crystal compositions LC-C1 (Comparative Example 8) and LC-C2 (Comparative Example 9), respectively. The physical properties, VHR (Init), and VHR (HEAT) of these compositions were measured; and the compositions were subjected to the evaluations of droplet stains and linear afterimages. Results of the measurement and evaluations were as follows.

TABLE 3

|  |  | Example 3 LC-3 | Comparative Example 7 LC-C | Comparative Example 8 LC-C1 | Comparative Example 9 LC-C2 |
|---|---|---|---|---|---|
| 3-Cy-Ph—O1 |  | — | 4 | — | — |
| 3-Cy-Cy-V | General Formula (IV-a) | — | 37 | — | — |
| 3-Cy-Cy-V1 | General Formula (IV-a) | — | 4 | — | — |
| 3-Cy-1O—Ph5—O2 | General Formula (I-a) | — | 9 | — | — |
| 3-Cy-Cy-1O—Ph5—O2 | General Formula (I-a) | — | 14 | — | — |
| V-Cy-Cy-Ph5—O2 | General Formula (I-a) | — | 10 | — | — |
| 3-Ph—Ph5—Ph-1 | General Formula (III) | — | 8 | — | — |
| 3-Ph—Ph5—Ph-2 | General Formula (III) | — | 14 | — | — |
| Comparative Example 7 |  | 99.9 |  | 99.9 | 99.9 |
| Antioxidant (II-a) |  | 0.1 | — | — | — |
| Antioxidant (St-1) |  | — | — | 0.1 | — |
| Antioxidant (St-2) |  | — | — | — | 0.1 |
| Total |  | 100 | 100 | 100 | 100 |
| Tni[° C.] |  | 75.1 | 76.0 | 74.6 | 74.8 |
| $\Delta n$ |  | 0.108 | 0.108 | 0.108 | 0.108 |
| $\eta[mPa \cdot s]$ |  | 13.5 | 13.5 | 13.4 | 13.7 |
| $\gamma^1[mPa \cdot s]$ |  | 90 | 91 | 90 | 89 |
| RT[msec] |  | 3.7 | 3.7 | 3.7 | 3.7 |
| $\Delta\epsilon$ |  | −2.82 | −2.82 | −2.80 | −2.82 |
| VHR(Init) |  | 99.8 | 99.7 | 99.8 | 99.8 |
| VHR(HEAT) |  | 99.6 | 97.8 | 99.1 | 99.2 |
| Droplet stains |  | Excellent | Excellent | Good | Good |
| Linear afterimages |  | Excellent | Poor | Bad | Poor |

The results showed that the liquid crystal composition LC-3 was a liquid crystal composition having a negative $\Delta\epsilon$, a liquid crystal phase in a wide temperature range, a small viscosity, a good solubility at low temperature, a high specific resistance and voltage holding ratio, and a stability to heat and light; in addition, a liquid crystal display device using such a liquid crystal composition had an excellent display quality and was less likely to suffer from defective display such as droplet stains and linear afterimages.

Example 4 and Comparative Examples 10 to 12

A liquid crystal composition LC-D (Comparative Example 10) was prepared, and then 0.2% of an antioxidant (II-a) was added to 99.8% of the LC-D to prepare a liquid crystal composition LC-4 (Example 4). To 99.8% of the LC-D, 0.2% of antioxidants (St-1) and (St-2) were added to prepare liquid crystal compositions LC-D1 (Comparative Example 11) and LC-D2 (Comparative Example 12), respectively. The physical properties, VHR (Init), and VHR (HEAT) of these compositions were measured; and the compositions were subjected to the evaluations of droplet stains and linear afterimages. Results of the measurement and evaluations were as follows.

The results showed that the liquid crystal composition LC-4 was a liquid crystal composition having a negative $\Delta\epsilon$, a liquid crystal phase in a wide temperature range, a small viscosity, a good solubility at low temperature, a high specific resistance and voltage holding ratio, and a stability to heat and light; in addition, a liquid crystal display device using such a liquid crystal composition had an excellent display quality and was less likely to suffer from defective display such as droplet stains and linear afterimages.

Example 5 and Comparative Example 13

A liquid crystal composition LC-E (Comparative Example 13) was prepared, and then 0.2% of an antioxidant (II-a) was added to 99.8% of the LC-E to prepare a liquid crystal composition LC-5 (Example 5). The physical properties, VHR (Init), and VHR (HEAT) of these compositions were measured; and the compositions were subjected to the evaluations of droplet stains and linear afterimages. Results of the measurement and evaluations were as follows.

TABLE 4

|  |  | Example 4 LC-4 | Comparative Example 10 LC-D | Comparative Example 11 LC-D1 | Comparative Example 12 LC-D2 |
|---|---|---|---|---|---|
| 1V-Cy-Ph—O1 |  | — | 4 | — | — |
| 3-Cy-Cy-V | General Formula (IV-a) | — | 41 | — | — |
| 1V-Cy-Ph5—O2 | General Formula (I-a) | — | 9 | — | — |
| 3-Cy-Cy-1O—Ph5—O2 | General Formula (I-a) | — | 14 | — | — |
| V-Cy-Cy-Ph5—O2 | General Formula (I-a) | — | 10 | — | — |
| 3-Ph—Ph5—Ph-1 | General Formula (III) | — | 8 | — | — |
| 3-Ph—Ph5—Ph-2 | General Formula (III) | — | 14 | — | — |
| Comparative Example 10 |  | 99.8 | — | 99.8 | 99.8 |
| Antioxidant (II-a) |  | 0.2 | — | — | — |
| Antioxidant (St-1) |  | — | — | 0.2 | — |
| Antioxidant (St-2) |  | — | — | — | 0.2 |
| Total |  | 100 | 100 | 100 | 100 |
| Tni[° C.] |  | 75.1 | 76.8 | 74.5 | 74.7 |
| $\Delta n$ |  | 0.110 | 0.111 | 0.110 | 0.109 |
| $\eta$[mPa·s] |  | 13.4 | 13.4 | 13.4 | 13.4 |
| $\gamma^1$[mPa·s] |  | 90 | 91 | 90 | 91 |
| RT[msec] |  | 3.7 | 3.7 | 3.7 | 3.7 |
| $\Delta\epsilon$ |  | −2.80 | −2.84 | −2.82 | −2.80 |
| VHR(Init) |  | 99.8 | 99.7 | 99.8 | 99.8 |
| VHR(HEAT) |  | 99.5 | 98.4 | 99.2 | 98.9 |
| Droplet stains |  | Excellent | Excellent | Bad | Bad |
| Linear afterimages |  | Excellent | Poor | Bad | Poor |

TABLE 5

|  |  | Example 5 LC-5 | Comparative Example 13 LC-E |
|---|---|---|---|
| 1V-Cy-Ph—O1 |  | — | 4 |
| 3-Cy-Cy-V | General Formula (IV-a) | — | 41 |
| 1V-Cy-Ph5—O2 | General Formula (I-a) | — | 9 |
| 3-Cy-Cy-1O—Ph5—O2 | General Formula (I-a) | — | 14 |
| V-Cy-Cy-Ph5—O2 | General Formula (I-a) | — | 10 |
| 3-Ph—Ph5—Ph-1 | General Formula (III) | — | 8 |
| 3-Ph—Ph5—Ph-2 | General Formula (III) | — | 14 |
| Comparative Example 13 |  | 99.8 | — |
| Antioxidant (II-a) |  | 0.2 | — |
| Total |  | 100 | 100 |
| Tni[° C.] |  | 75.1 | 76.8 |
| Δn |  | 0.110 | 0.111 |
| η[mPa·s] |  | 13.4 | 13.4 |
| γ¹[mPa·s] |  | 91 | 91 |
| RT[msec] |  | 3.7 | 3.7 |
| Δε |  | −2.84 | −2.84 |
| VHR(Init) |  | 99.8 | 99.7 |
| VHR(HEAT) |  | 99.5 | 98.4 |
| Droplet stains |  | Excellent | Excellent |
| Linear afterimages |  | Excellent | Poor |

The results showed that the liquid crystal composition LC-5 was a liquid crystal composition having a negative Δε, a liquid crystal phase in a wide temperature range, a small viscosity, a good solubility at low temperature, a high specific resistance and voltage holding ratio, and a stability to heat and light; in addition, a liquid crystal display device using such a liquid crystal composition had an excellent display quality and was less likely to suffer from defective display such as droplet stains and linear afterimages.

Examples 6 and 7 and Comparative Examples 14 and 15

A liquid crystal composition LC-F (Comparative Example 14) was prepared, and then 0.05% of an antioxidant (II-a) was added to 99.95% of the LC-F to prepare a liquid crystal composition LC-6 (Example 6). A liquid crystal composition LC-G (Comparative Example 15) was prepared, and then 0.05% of the antioxidant (II-a) was added to 99.95% of the LC-G to prepare a liquid crystal composition LC-7 (Example 7). The physical properties, VHR (Init), and VHR (HEAT) of these compositions were measured; and the compositions were subjected to the evaluations of droplet stains and linear afterimages. Results of the measurement and evaluations were as follows.

TABLE 6

|  |  | Example 6 LC-6 | Comparative Example 14 LC-F | Example 7 LC-7 | Comparative Example 15 LC-G |
|---|---|---|---|---|---|
| 3-Cy-Cy-V | General Formula (IV-a) | — | 43 | — | 43 |
| 3-Ph—Ph—O1 | General Formula (IV-b) | — | 3 | — | 3 |
| 3-Cy-1O—Ph5—O1 | General Formula (I-a) | — | — | — | 4 |
| 3-Cy-1O—Ph5—O2 | General Formula (I-a) | — | 7 | — | 7 |
| 2-Cy-Cy-1O—Ph5—O2 | General Formula (I-a) | — | 13 | — | 12 |
| 3-Cy-Cy-1O—Ph5—O2 | General Formula (I-a) | — | 13 | — | 12 |
| 2-Cy-Cy-1O—Np4—O2 | General Formula (I-b) | — | 3 | — | — |
| 3-Cy-Cy-1O—Ch3—O5 | General Formula (I-c) | — | — | — | 3 |
| 3-Ph—Ph5—Ph-1 | General Formula (III) | — | 9 | — | 8 |
| 3-Ph—Ph5—Ph-2 | General Formula (III) | — | 9 | — | 8 |
| Comparative Example 14 |  | 99.95 | — | — | — |
| Comparative Example 15 |  | — | — | 99.95 | — |
| Antioxidant (II-a) |  | 0.05 | — | 0.05 | — |
| Total |  | 100 | 100 | 100 | 100 |
| Tni[° C.] |  | 79.5 | 80.0 | 71.6 | 72.2 |
| Δn |  | 0.107 | 0.107 | 0.099 | 0.099 |
| η[mPa·s] |  | 14.8 | 14.9 | 14.1 | 14.0 |
| γ¹[mPa·s] |  | 93 | 94 | 98 | 99 |
| RT[msec] |  | 3.8 | 3.8 | 4.0 | 4.0 |
| Δε |  | −3.30 | −3.31 | −3.28 | −3.28 |
| VHR(Init) |  | 99.8 | 99.6 | 99.8 | 99.7 |
| VHR(HEAT) |  | 99.7 | 99.5 | 99.7 | 99.6 |
| Droplet stains |  | Excellent | Bad | Excellent | Good |
| Linear afterimages |  | Excellent | Poor | Excellent | Bad |

The results showed that the liquid crystal compositions LC-6 and LC-7 were liquid crystal compositions each having a negative Δ∈, a liquid crystal phase in a wide temperature range, a small viscosity, a good solubility at low temperature, a high specific resistance and voltage holding ratio, and a stability to heat and light; in addition, liquid crystal display devices using such liquid crystal compositions had an excellent display quality and were less likely to suffer from defective display such as droplet stains and linear afterimages.

Example 8 and Comparative Example 16

A liquid crystal composition LC-H (Comparative Example 16) was prepared, and then 0.01% of an antioxidant (II-a) was added to 99.99% of the LC-H to prepare a liquid crystal composition LC-8 (Example 8). The physical properties, VHR (Init), and VHR (HEAT) of these compositions were measured; and the compositions were subjected to the evaluations of droplet stains and linear afterimages. Results of the measurement and evaluations were as follows.

TABLE 7

|  |  | Example 8 LC-8 | Comparative Example 16 LC-H |
|---|---|---|---|
| 3-Cy-Cy-V | General Formula (IV-a) | — | 8 |
| 3-Cy-Cy-V1 | General Formula (IV-a) | — | 10 |
| 3-Cy-Cy-2 | General Formula (IV-a) | — | 10 |
| 3-Cy-Cy-4 | General Formula (IV-a) | — | 6 |
| 3-Cy-Cy-5 | General Formula (IV-a) | — | 6 |
| 1V2-Ph—Ph-1 | General Formula (IV-b) | — | 4 |
| 3-Cy-Cy-Ph-1 | General Formula (IV-c) | — | 4 |
| 3-Cy-Ph5—O2 | General Formula (I-a) | — | 10 |
| 3-Ph—Ph5—O2 | General Formula (I-a) | — | 13 |
| 3-Cy-Cy—Ph5—O2 | General Formula (I-a) | — | 12 |
| 2-Cy-Ph—Ph5—O2 | General Formula (I-a) | — | 6 |
| 3-Cy-Ph—Ph5—O2 | General Formula (I-a) | — | 11 |
| Comparative Example 16 |  | 99.99 | — |
| Antioxidant (II-a) |  | 0.01 | — |
| Total |  | 100 | 100 |
| Tni[° C.] |  | 75.2 | 75.3 |
| Δn |  | 0.105 | 0.105 |
| η[mPa · s] |  | 16.0 | 16.0 |
| γ¹[mPa · s] |  | 81 | 81 |
| RT[msec] |  | 3.5 | 3.5 |
| Δε |  | −2.90 | −2.90 |
| VHR(Init) |  | 99.8 | 99.6 |
| VHR(HEAT) |  | 99.8 | 99.5 |
| Droplet stains |  | Excellent | Bad |
| Linear afterimages |  | Excellent | Bad |

The results showed that the liquid crystal composition LC-8 was a liquid crystal composition having a negative Δ∈, a liquid crystal phase in a wide temperature range, a small viscosity, a good solubility at low temperature, a high specific resistance and voltage holding ratio, and a stability to heat and light; in addition, a liquid crystal display device using such a liquid crystal composition had an excellent display quality and was less likely to suffer from defective display such as droplet stains and linear afterimages.

Example 9 and Comparative Example 17

A liquid crystal composition LC-I (Comparative Example 17) was prepared, and then 0.01% of an antioxidant (II-a) was added to 99.99% of the LC-I to prepare a liquid crystal composition LC-9 (Example 9). The physical properties, VHR (Init), and VHR (HEAT) of these compositions were measured; and the compositions were subjected to the evaluations of droplet stains and linear afterimages. Results of the measurement and evaluations were as follows.

TABLE 8

|  |  | Example 9 LC-9 | Comparative Example 17 LC-1 |
|---|---|---|---|
| 5-Cy-Cy-O1 | General Formula (IV-a) | — | 5 |
| 5-Cy-Cy-3 | General Formula (IV-a) | — | 10 |
| 3-Cy-Cy-V | General Formula (IV-a) | — | 5 |
| 3-Cy-Ph—O1 |  | — | 10 |
| 3-Cy-Ph5—O2 | General Formula (I-a) | — | 8 |
| 3-Cy-Ph5—O4 | General Formula (I-a) | — | 10 |
| 2-Cy-Cy-Ph5-1 | General Formula (I-a) | — | 10 |
| 3-Cy-Cy-Ph5-1 | General Formula (I-a) | — | 10 |
| 3-Cy-Cy-Ph5—O2 | General Formula (I-a) | — | 10 |
| 5-Cy-Cy-Ph5—O2 | General Formula (I-a) | — | 10 |
| 3-Cy-Ph—Ph5—O2 | General Formula (I-a) | — | 12 |
| Comparative Example 17 |  | 99.99 | — |
| Antioxidant (II-a) |  | 0.01 | — |
| Total |  | 100 | 100 |
| Tni[° C.] |  | 78.6 | 78.7 |
| Δn |  | 0.090 | 0.090 |
| η[mPa · s] |  | 26.5 | 26.5 |
| γ¹[mPa · s] |  | 119 | 119 |
| RT[msec] |  | 4.5 | 4.5 |
| Δε |  | −3.20 | −3.20 |
| VHR(Init) |  | 99.9 | 99.7 |
| VHR(HEAT) |  | 99.9 | 99.7 |
| Droplet stains |  | Excellent | Good |
| Linear afterimages |  | Excellent | Bad |

The results showed that the liquid crystal composition LC-9 was a liquid crystal composition having a negative Δ∈, a liquid crystal phase in a wide temperature range, a good solubility at low temperature, a high specific resistance and voltage holding ratio, and a stability to heat and light; in addition, a liquid crystal display device using such a liquid crystal composition had an excellent display quality and was less likely to suffer from defective display such as droplet stains and linear afterimages.

The invention claimed is:

1. A nematic liquid crystal composition having a negative dielectric anisotropy with an absolute value from 2 to 8 at 25° C., the composition comprising at least one liquid crystal compound having a negative dielectric anisotropy with an absolute value of 4 or more and at least one antioxidant represented by General Formula (II), wherein the amount of the liquid crystal compound is not less than 3%

[Chem. 1]

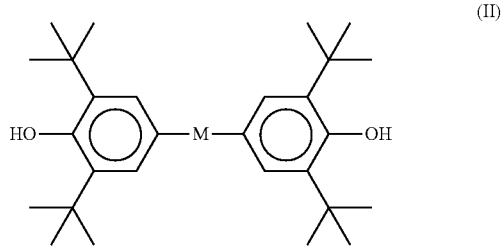

(II)

(where M represents an alkylene group having 1 to 15 carbon atoms or a single bond).

2. The nematic liquid crystal composition according to claim 1, wherein the liquid crystal compound having a negative dielectric anisotropy with an absolute value of 4 or more is a compound represented by General Formula (I-a)

[Chem. 2]

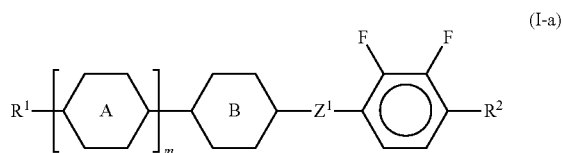

(I-a)

(where $R^1$ and $R^2$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; rings A and B each independently represent a trans-1,4-cyclohexylene group or a 1,4-phenylene group; any hydrogen atom of the 1,4-phenylene group is optionally substituted with a fluorine atom; $Z^1$ represents —OCH$_2$—, —CH$_2$O—, —CF$_2$O—, —OCF$_2$—, —CH$_2$CH$_2$—, —CF$_2$CF$_2$—, or a single bond; and m represents 0, 1, or 2).

3. The nematic liquid crystal composition according to claim 1, wherein the liquid crystal compound having a negative dielectric anisotropy with an absolute value of 4 or more is a compound represented by General Formula (I-b) or (I-bb)

[Chem. 3]

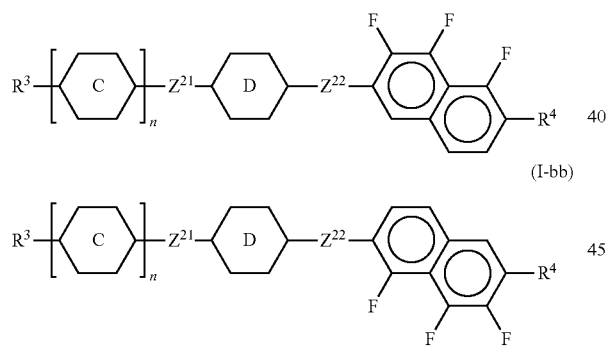

(I-b)

(I-bb)

(where $R^3$ and $R^4$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; rings C and D each independently represent a trans-1,4-cyclohexylene group or a 1,4-phenylene group; any hydrogen atom of the 1,4-phenylene group is optionally substituted with a fluorine atom; $Z^{21}$ and $Z^{22}$ each independently represent —OCH$_2$—, —CH$_2$O—, —CF$_2$O—, —OCF$_2$—, —CH$_2$CH$_2$—, —CF$_2$CF$_2$—, —COO—, —OCO—, —CH═CH—, or a single bond; and n represents 0, 1, or 2).

4. The nematic liquid crystal composition according to claim 1, wherein the liquid crystal compound having a negative dielectric anisotropy with an absolute value of 4 or more is a compound represented by General Formula (I-c) or (I-cc)

[Chem. 4]

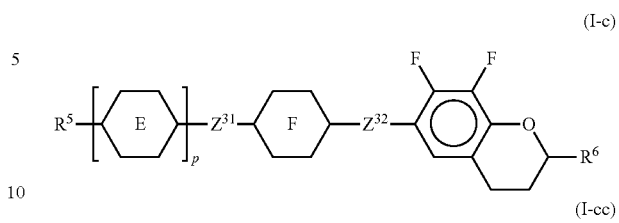

(I-c)

(I-cc)

(where $R^5$ and $R^6$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; rings E and F each independently represent a trans-1,4-cyclohexylene group or a 1,4-phenylene group; any hydrogen atom of the 1,4-phenylene group is optionally substituted with a fluorine atom; $Z^{31}$ and $Z^{32}$ each independently represent —OCH$_2$—, —CH$_2$O—, —CF$_2$O—, —OCF$_2$—, —CH$_2$CH$_2$—, —CF$_2$CF$_2$—, —COO—, —OCO—, —CH═CH—, or a single bond; and p represents 0, 1, or 2).

5. The nematic liquid crystal composition according to claim 1, wherein the antioxidant represented by General Formula (II) is a compound represented by General Formula (II-a)

[Chem. 5]

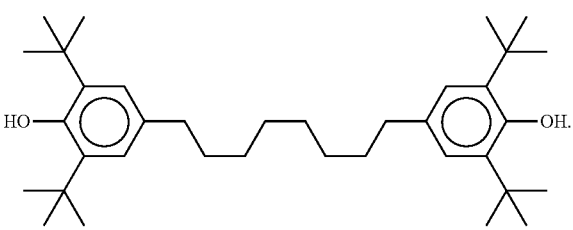

(II-a)

6. The nematic liquid crystal composition according to claim 2, wherein $Z^1$ in General Formula (I-a) is —CH$_2$O—.

7. The liquid crystal composition according to claim 1, further comprising at least one polymerizable compound.

8. A liquid crystal display device comprising a first substrate formed of a transparent conductive material and having a common electrode, a second substrate formed of a transparent conductive material and having a pixel electrode and a thin film transistor which is provided in a pixel to control the pixel electrode, and a liquid crystal composition disposed between the first substrate and the second substrate, wherein the liquid crystal molecules of the liquid crystal composition are aligned substantially vertical to the substrates in a state in which voltage is not applied, and the liquid crystal composition is the nematic liquid crystal composition according to claim 1.

9. A liquid crystal display device comprising the liquid crystal composition according to claim 8, wherein the liquid crystal display device is produced through polymerization of the polymerizable compound contained in the liquid crystal composition, optionally under application of voltage.

\* \* \* \* \*